United States Patent
Wang et al.

(10) Patent No.: US 10,553,168 B2
(45) Date of Patent: Feb. 4, 2020

(54) BLACK FRAME INSERTION (BFI) PROCESSING METHOD AND DEVICE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Junwei Wang, Beijing (CN); Jiajia Song, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/228,248

(22) Filed: Aug. 4, 2016

(65) Prior Publication Data
US 2017/0193936 A1    Jul. 6, 2017

(30) Foreign Application Priority Data

Jan. 4, 2016  (CN) ......................... 2016 1 0004367

(51) Int. Cl.
G09G 3/36      (2006.01)
G06F 3/041     (2006.01)

(52) U.S. Cl.
CPC ......... *G09G 3/3618* (2013.01); *G06F 3/0414* (2013.01); *G06F 3/0418* (2013.01); *G06F 2203/04105* (2013.01); *G09G 2310/08* (2013.01); *G09G 2320/0233* (2013.01); *G09G 2340/16* (2013.01)

(58) Field of Classification Search
CPC .... G09G 3/3618; G06F 3/0414; G06F 3/0418
See application file for complete search history.

(56) References Cited

U.S. PATENT DOCUMENTS

| 2004/0189583 | A1* | 9/2004 | Park | G09G 3/3677 345/100 |
| 2007/0262943 | A1* | 11/2007 | Kang | G09G 3/3648 345/98 |
| 2008/0143659 | A1* | 6/2008 | Ma | G09G 3/3677 345/87 |

(Continued)

FOREIGN PATENT DOCUMENTS

| CN | 103325346 A | 9/2013 |
| CN | 104505051 A | 4/2015 |

(Continued)

OTHER PUBLICATIONS

Chinese Office Action in Chinese Application No. 201610004367. X, dated May 25, 2018 with English translation.

*Primary Examiner* — Nitin Patel
*Assistant Examiner* — Robert M Stone
(74) *Attorney, Agent, or Firm* — Collard & Roe, P.C.

(57) ABSTRACT

A black frame insertion (BFI) processing method and device and a display device thereof. The BFI processing method includes: determining whether a piezoelectric signal detected in response to a touch operation is greater than a pressure threshold; generating a trigger signal when determining that the piezoelectric signal is greater than the pressure threshold; and controlling a display panel to perform BFI display based on the trigger signal and a logic determination signal.

20 Claims, 6 Drawing Sheets

(56) References Cited

U.S. PATENT DOCUMENTS

| | | | | |
|---|---|---|---|---|
| 2008/0260280 A1* | 10/2008 | Wu | ................ | G09G 3/3648 |
| | | | | 382/254 |
| 2009/0160828 A1* | 6/2009 | Chung | ................ | G09G 3/2092 |
| | | | | 345/204 |
| 2009/0237374 A1* | 9/2009 | Li | ................ | G06F 3/0414 |
| | | | | 345/174 |
| 2012/0162133 A1* | 6/2012 | Chen | ................ | G06F 3/0412 |
| | | | | 345/174 |
| 2014/0160058 A1* | 6/2014 | Chen | ................ | G06F 3/0412 |
| | | | | 345/174 |
| 2015/0301676 A1* | 10/2015 | Xu | ................ | G06F 3/041 |
| | | | | 345/174 |
| 2016/0162074 A1* | 6/2016 | Huang | ................ | G06F 3/044 |
| | | | | 345/174 |
| 2016/0343287 A1 | 11/2016 | Xu et al. | | |
| 2017/0140717 A1 | 5/2017 | Ji et al. | | |

FOREIGN PATENT DOCUMENTS

| | | |
|---|---|---|
| CN | 105093741 A | 11/2015 |
| CN | 105183360 A | 12/2015 |
| CN | 105204763 A | 12/2015 |

\* cited by examiner

BLACK FRAME INSERTION (BFI) PROCESSING METHOD AND DEVICE AND DISPLAY DEVICE

CROSS REFERENCE TO RELATED APPLICATIONS

Applicant claims priority under 35 U.S.C. § 119 of Chinese Application No. 201610004367.X filed on Jan. 4, 2016, the disclosure of which is incorporated by reference.

TECHNICAL FIELD

Embodiments of the present disclosure relate to a black frame insertion (BFI) processing method, a BFI processing device and a display device thereof.

BACKGROUND

With the development of display technologies, advanced super dimension switch (ADS) display devices are applied more and more widely.

In an ADS display device, when driven by a high voltage (e.g., a voltage corresponding to L255), liquid crystals in weak electric field areas of pixels (e.g., corners, slit gaps or centerlines of slit electrodes) may be arranged in disorder after being interfered by external forces and cannot restore to an ideal arrangement state, easily causing trace mura to occur.

SUMMARY

Embodiments of the present disclosure provide a black frame insertion (BFI) processing method. The BFI processing method includes: determining whether a piezoelectric signal detected in response to a touch operation is greater than a pressure threshold; generating a trigger signal when determining that the piezoelectric signal is greater than the pressure threshold; and controlling a display panel to perform BFI display based on the trigger signal and a logic determination signal.

Embodiments of the present disclosure also provide a BFI processing device. The BFI processing device includes: a signal processing unit; and a signal control unit. The signal processing unit is configured to determine whether a piezoelectric signal detected in response to a touch operation is greater than a pressure threshold and to generate a trigger signal when the piezoelectric signal is determined to be greater than the pressure threshold. The signal control unit is configured to control a display panel to perform BFI display based on the trigger signal and a logic determination signal.

Embodiments of the present disclosure also provide a display device. The display device includes a display panel, a pressure sensing layer and the BFI processing device described above. The pressure sensing layer is disposed on the display panel and the signal processing unit is connected with the pressure sensing layer. The pressure sensing layer is configured to detect the piezoelectric signal in response to the touch operation

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

Detailed description will be given below with reference to the accompanying drawings for the BFI processing method and device and the display device provided by embodiments of the present disclosure.

Figure 1:
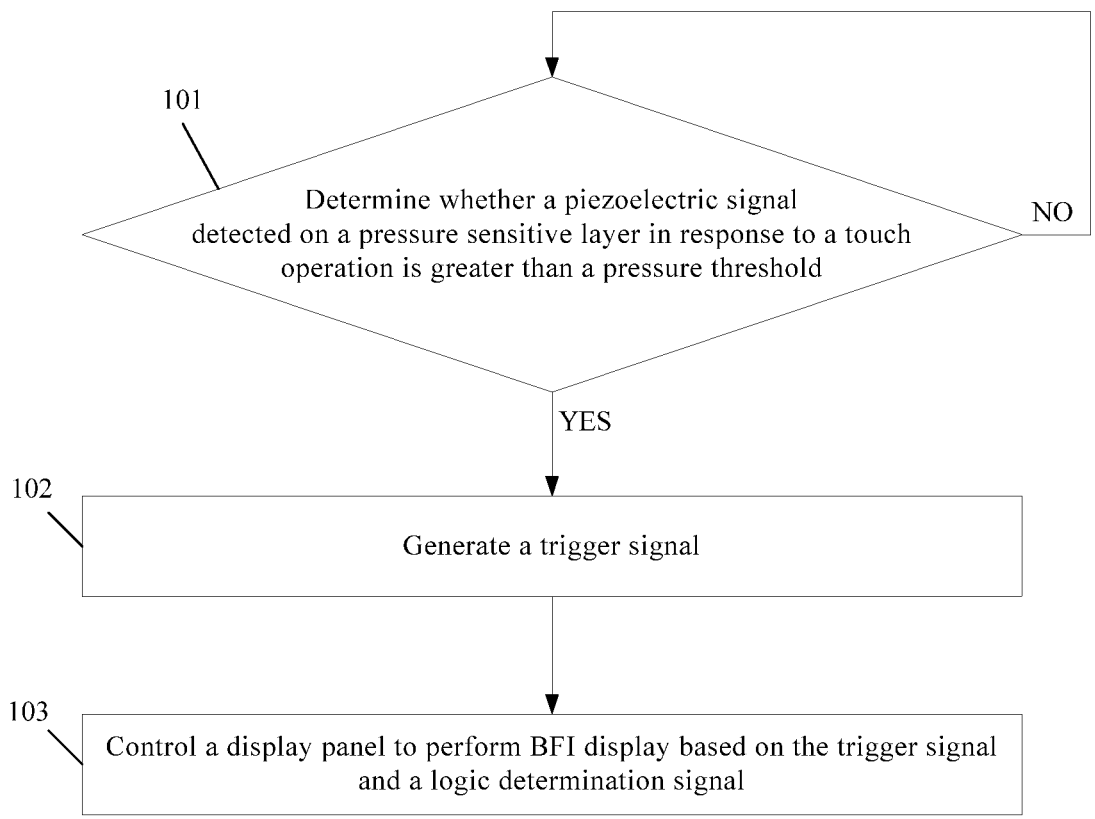
FIG. 1 is a flowchart of a BFI processing method provided by a first embodiment of the present disclosure.

FIG. 1 is a flowchart of a BFI processing method provided by a first embodiment of the present disclosure. As illustrated in FIG. 1, the method includes steps S101, S102 and S103.

The step S101 includes determining whether a piezoelectric signal detected on a pressure sensing layer in response to a touch operation is greater than a pressure threshold. When the piezoelectric signal is greater than the pressure threshold, the step S102 is executed; and when the piezoelectric signal is not greater than the pressure threshold, the method continues to execute the step S101.

In the embodiment, the pressure sensing layer may be disposed on a display panel. When a user touches the display panel, the pressure sensing layer is also touched, and at this point, a piezoelectric signal is detected on the pressure sensing layer due to occurrence of the touch. Subsequently, whether the piezoelectric signal is greater than the pressure threshold is determined; when the piezoelectric signal is determined to be greater than the pressure threshold, it indicates that the pressure caused by the touch may result in occurrence of trace mura during display; and when the piezoelectric signal is determined to be less than or equal to the pressure threshold, it indicates that the pressure caused by the touch may not result in occurrence of trace mura during display. For instance, the pressure threshold may be preset as needed. In this step, when the piezoelectric signal is determined to be less than or equal to the pressure threshold, the method may continue to wait for arrival of a next piezoelectric signal. That is, the method may continue to execute the step S101.

For instance, the step S101 may further include: filtering and amplifying the piezoelectric signal, and performing a differential comparison between the amplified piezoelectric signal and the pressure threshold to determine whether the amplified piezoelectric signal is greater than the pressure threshold.

The step S102 includes generating a trigger signal.

For instance, a logic value of the trigger signal is 1. In another instance, the logic value of the trigger signal may also be another suitable value.

The step S103 includes controlling the display panel to perform BFI display based on the trigger signal and a logic determination signal.

The trigger signal indicates that BFI display needs to be performed on the display panel and the trigger signal may be used for triggering a start of the BFI display.

In the embodiment, when performing BFI display in a vertical blanking interval of a frame, the logic determination signal is a last-row gate signal (e.g., a signal applied to a gate line in the last row); and when performing the BFI display during the process of displaying the frame, the logic determination signal is a start signal and a logic clock signal. For instance, the start signal may be a start vertical (STV) signal. For instance, the STV signal may start the display of a frame.

In the BFI processing method provided by the embodiment, when the piezoelectric signal detected by the pressure sensing layer is determined to be greater than the pressure threshold, the display panel is controlled to perform BFI display according to the trigger signal and the logic determination signal, so that the phenomenon of trace mura can be avoided.

Figure 2:
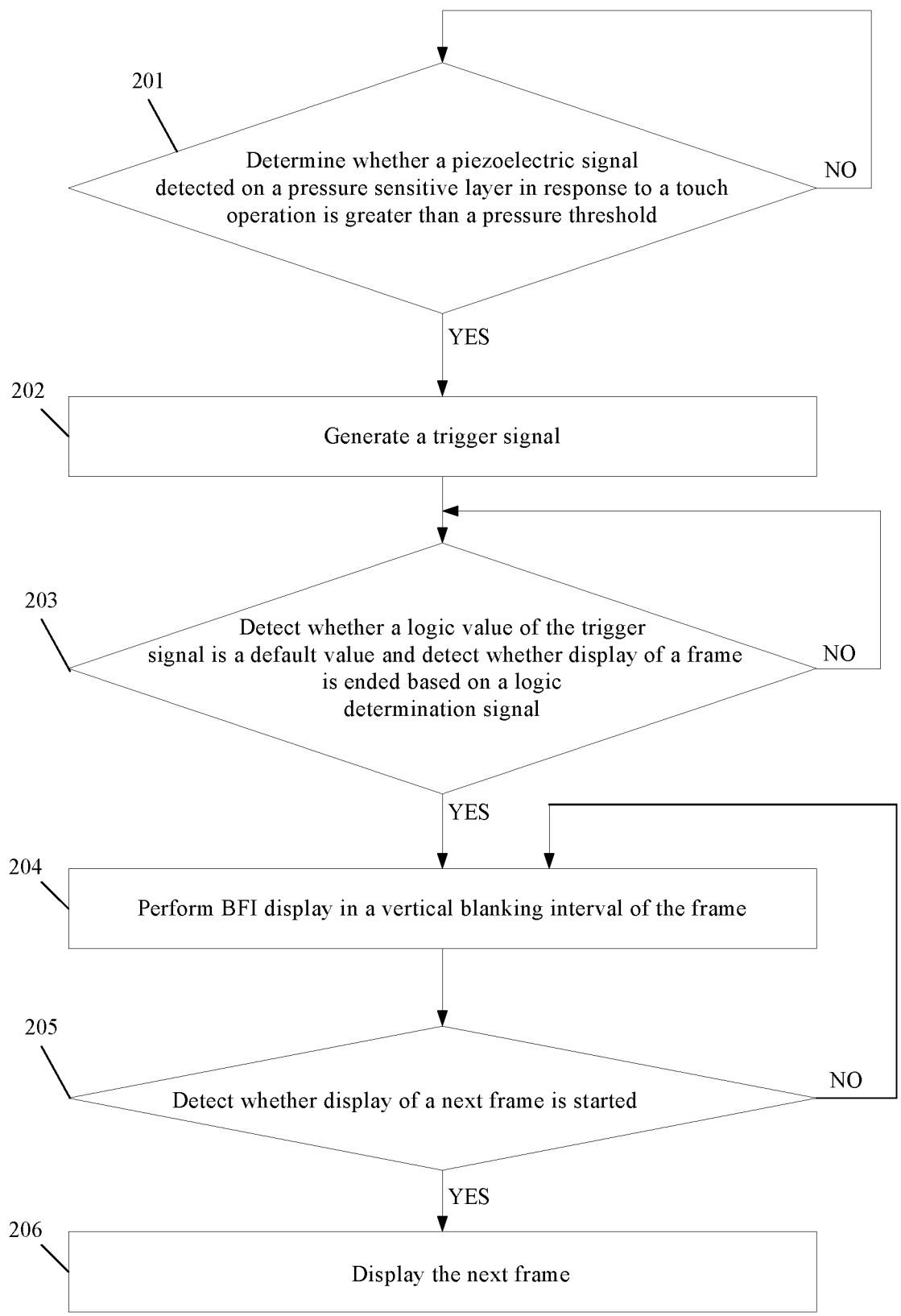
FIG. 2 is a flowchart of a BFI processing method provided by a second embodiment of the present disclosure.

FIG. 2 is a flowchart of a BFI processing method provided by a second embodiment of the present disclosure. As illustrated in FIG. 2, the method includes the steps S201 to S206.

The step S201 includes determining whether a piezoelectric signal detected on a pressure sensing layer in response to a touch operation is greater than a pressure threshold. If so (that is, the piezoelectric signal is greater than the pressure threshold), the step S202 is executed; and if not (that is, the piezoelectric signal is not greater than the pressure threshold), the method continues to execute the step S201.

In the embodiment, the pressure sensing layer may be disposed on the display panel. When a user touches the display panel, the pressure sensing layer is also touched, and at this point, the piezoelectric signal may be detected by the pressure sensing layer due to occurrence of the touch. Subsequently, whether the piezoelectric signal is greater than the pressure threshold is determined; when the piezoelectric signal is determined to be greater than the pressure threshold, it indicates that the pressure generated by the touch may result in the phenomenon of trace mura during display; and when the piezoelectric signal is determined to be less than or equal to the pressure threshold, it indicates that the pressure generated by the touch may not result in the phenomenon of trace mura during display. The pressure threshold may be preset as needed.

For instance, the step S201 may further include: amplifying the piezoelectric signal and determining whether the amplified piezoelectric signal is greater than the pressure threshold.

The step S202 includes generating a trigger signal.

For instance, a logic value of the trigger signal is 1. When the logic value of the trigger signal is 1, it indicates that the display panel may need to perform BFI display and the logic value of the trigger signal may be used for triggering the start of the BFI display. In another instance, the logic value of the trigger signal may also be another suitable value.

The step S203 includes detecting whether the logic value of the trigger signal is a default value (e.g., the default value being 1) and detecting whether the display of a frame is ended according to a logic determination signal. If so (that is, the logic value of the trigger signal is the default value and the display of the frame is detected to be ended according to the logic determination signal), then the step S204 is executed; and if not (that is, the logic value of the trigger signal is not the default value and/or it is detected that the display of the frame is not yet ended according to the logic determination signal), then the method continues to execute the step S203.

In the embodiment, the logic determination signal includes a last-row gate signal (e.g., a signal being applied to a gate line in the last row) and a pre-charge capacitance. When it is detected that the logic value of the trigger signal is the default value and that the display of the frame is ended according to the last-row gate signal and the pre-charge capacitance, it indicates that the BFI display may be performed. When it is detected that the logic value of the trigger signal is not the default value and/or that the display of the frame is not ended yet according to the last-row gate signal and the pre-charge capacitance, it indicates that the BFI display cannot be performed; and at this point, the step S203 may be continuously executed to wait for the trigger signal and/or to wait for the end of the display of the frame. For instance, the default value for the logic value of the trigger signal is 1. In another instance, the default value for the logic value of the trigger signal may also be other values.

The step S202 may include:

S2021: detecting whether the logic value of the trigger signal is the default value; and S2022: determining whether the display of pixels corresponding to a gate line at the last row is ended by detecting the logic value of the last-row gate signal and the logic value of the pre-charge capacitance.

When the logic value of the last-row gate signal is 1 and the logic value of the pre-charge capacitance is 1, it indicates that the pixels of the frame that correspond to the gate line in the last row are being displayed. When the logic value of the last-row gate signal is 0 and the logic value of the pre-charge capacitance is 1, it indicates that the pixels of the frame that correspond to the gate line in the last row have stopped displaying, and hence it indicates that the display of the frame is ended and the BFI display may be started. For instance, when the logic value of the last-row gate signal is 1, the capacitance is pre-charged so that the logic value of the pre-charge capacitance is set to be 1; and subsequently, when the logic value of the last-row gate signal is changed to 0, the logic value of the pre-charge capacitance is kept to be 1 to facilitate the BFI display subsequently. In other words, a purpose of setting the logic value of the pre-charge capacitance is to satisfy the condition of BFI display, so as to facilitate subsequent BFI display. The logic value of the pre-charge capacitance in the subsequent BFI display process may be kept to be 1.

The step S204 includes performing BFI display in the vertical blanking interval of the frame.

When it is detected in the step S203 that the display of the frame is ended, the vertical blanking interval of the frame begins. At this point, if BFI display is needed, the BFI display may be performed in the vertical blanking interval.

In the vertical blanking interval of the frame, all the TFTs of the display panel are switched on (for instance, all the gate driving signals applied to the gate lines are changed from a low voltage level to a high voltage level, so that all the TFTs can be switched on), and all data voltage signals outputted from the data lines of the display panel are 0 so as to display a black frame, and hence the BFI display in the vertical blanking interval can be achieved. As the BFI display is performed in the vertical blanking interval in the embodiment, the normal display of image frames is not affected; and even if the pressure sensing layer continuously feeds back piezoelectric signals when the pressure sensing layer is subjected to continuous touch pressure, the normal display of the image frames is not affected either.

The step S205 includes detecting whether display of a next frame is started. If so (that is, the display of the next frame is started), the step S206 is executed; and if not (that is, the display of the next frame is not started), the step S204 is continuously executed. For example, the next frame can be a frame immediately subsequent to the current frame being subjected to the BFI display.

In the embodiment, whether the display of the next frame is started is detected according to the start signal. The step S205 may further include: determining whether the display of the next frame is started by detecting the logic value of the start signal; determining that the display of the next frame is started if the logic value of the start signal is 1; and determining that the display of the next frame is not started if the logic value of the start signal is 0. For instance, the start signal is an STV signal.

The step S206 includes displaying the next frame.

In the BFI processing method provided by the embodiment, when the piezoelectric signal detected on the pressure sensing layer is determined to be greater than the pressure threshold, the display panel is controlled to perform BFI display according to the trigger signal and the logic determination signal, so that the phenomenon of trace mura can be avoided.

Figure 3:
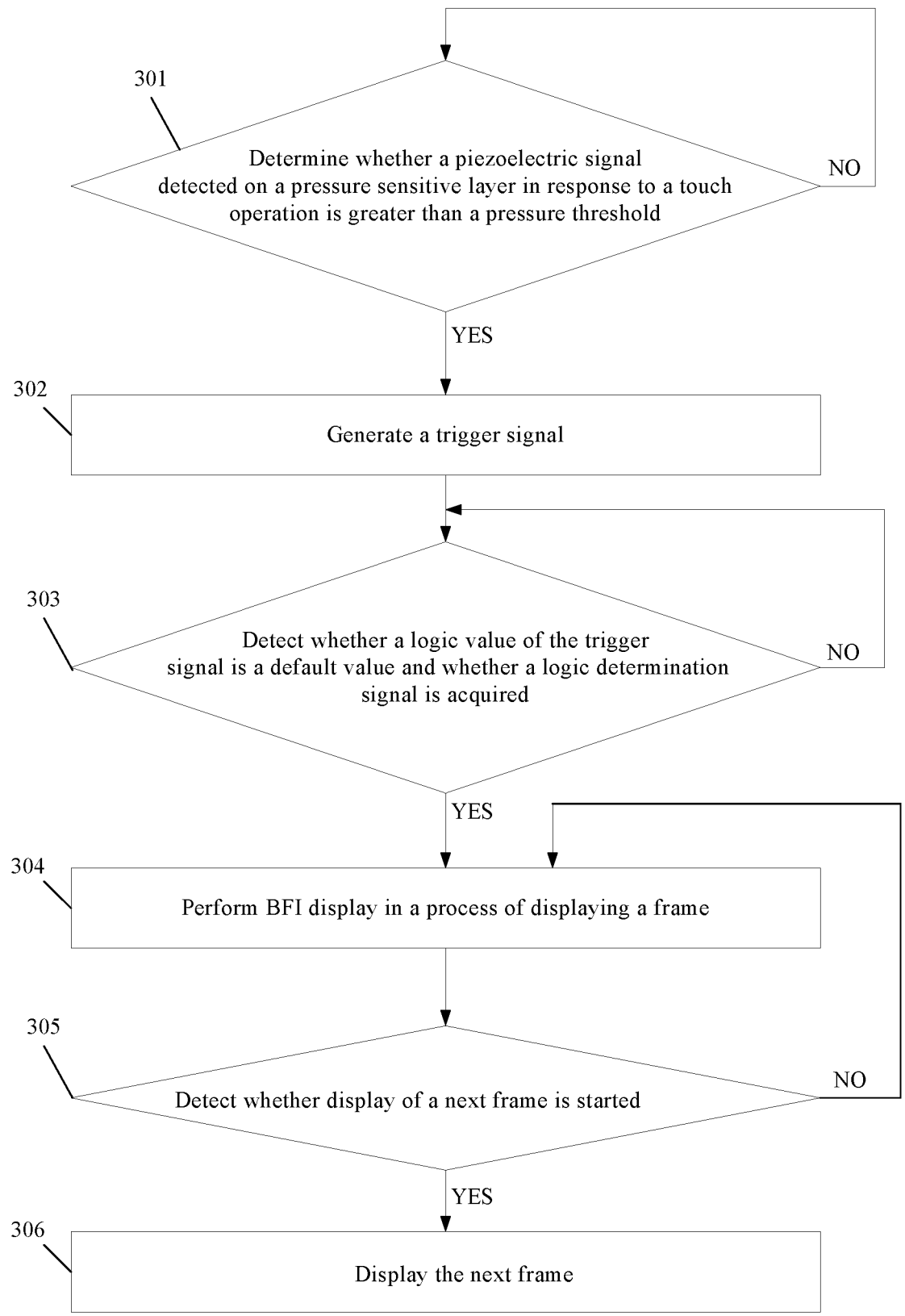
FIG. 3 is a flowchart of a BFI processing method provided by a third embodiment of the present disclosure.

FIG. 3 is a flowchart of a BFI processing method provided by a third embodiment of the present disclosure. As illustrated in FIG. 3, the method includes the steps S301 to S306.

The step S301 includes determining whether a piezoelectric signal detected on a pressure sensing layer in response to a touch operation is greater than a pressure threshold. If so (that is, the piezoelectric signal is greater than the pressure threshold), the step S302 is executed; and if not (that is, the piezoelectric signal is not greater than the pressure threshold), the step S301 is continuously executed.

In the embodiment, the pressure sensing layer may be disposed on a display panel. When a user touches the display panel, the pressure sensing layer is also touched, and at this point, the piezoelectric signal is detected by the pressure sensing layer due to the touch operation. Subsequently, whether the piezoelectric signal is greater than the pressure threshold is determined; when the piezoelectric signal is determined to be greater than the pressure threshold, it indicates that the pressure generated by the touch may result in the phenomenon of trace mura during display; and when the piezoelectric signal is determined to be less than or equal to the pressure threshold, it indicates that the pressure generated by the touch may not result in the phenomenon of trace mura during display. The pressure threshold may be pre-configured as needed.

For instance, the step S301 may include: amplifying the piezoelectric signal, performing a differential comparison between the amplified piezoelectric signal and the pressure threshold to determine whether the amplified piezoelectric signal is greater than the pressure threshold.

The step S302 includes generating a trigger signal.

For instance, the logic value of the trigger signal is 1. The trigger signal indicates that the display panel may perform BFI display. The trigger signal may be used for triggering the start of the BFI display.

The step S303 includes detecting whether the logic value of the trigger signal is a default value and detecting whether the logic determination signal is obtained. If so (that is, the logic value of the trigger signal is the default value and the logic determination signal is obtained), the step S304 is executed; and if not (that is, the logic value of the trigger signal is not the default value and/or the logic determination signal is not obtained), the step S303 is continuously executed.

In the embodiment, the logic determination signal includes a start signal and a logic clock signal. In the step S303, when detecting that the start signal is acquired, it indicates that the display of a frame may begin. The logic clock signal may be used for controlling a BFI frequency of the BFI display. Thus, when detecting that the logic clock signal is acquired, it indicates that the BFI display condition is satisfied, and hence BFI display may start.

The step S304 includes performing BFI display in the process of displaying a frame.

For instance, BFI display may be performed in the process of displaying a frame according to a period of the logic clock signal. Frames of images are displayed on the display panel at a refreshing frequency, and BFI display is performed during the process of displaying a certain frame according to the period of the logic clock signal. For instance, the logic clock signal may be a square signal or a pulse signal. For instance, when the refreshing frequency is 60 Hz or 75 Hz, frames of images are displayed on the display panel at the refreshing frequency of 60 Hz or 75 Hz; and when the period of the logic clock signal is 0.5 s or 1 s, BFI display is performed during the process of displaying a certain frame at intervals of 0.5 s or 1 s. When the certain frame is subjected to BFI display, all data voltage signals outputted from the data lines are 0, so that the displayed frame is a black image. In the embodiment, the logic clock signal is set so that the display panel can perform BFI display according to a specific period, and hence the normal display of image frames is not affected when the pressure sensing layer continuously feeds back the piezoelectric signals when being subjected to continuous touch pressure.

The step S305 includes detecting whether the display of a next frame is started. The next frame can be, for example, a frame immediately subsequent to the frame subjected to BFI display. If so (that is, the display of the next frame is started), the step S306 is executed; and if not (that is, the display of the next frame is not started), the step S304 is continuously executed.

The step S305 includes: determining whether the display of the next frame is started by detecting the logic value of the start signal; determining that the display of the next frame is started if the logic value of the start signal is 1; and determining that the display of the next frame is not started if the logic value of the start signal is 0. For instance, the start signal is an STV signal.

The step S306 includes displaying the next frame.

In the BFI processing method provided by the embodiment, when the piezoelectric signal detected on the pressure sensing layer is determined to be greater than the pressure threshold, the display panel is controlled to perform BFI display according to the trigger signal and the logic determination signal, so that the phenomenon of trace mura can be avoided.

Figure 4:
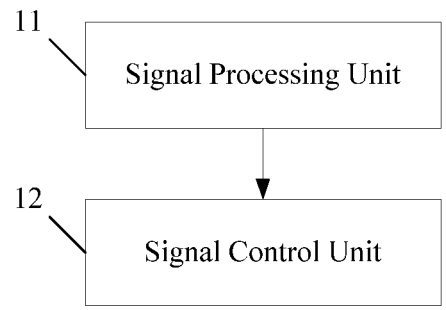
FIG. 4 is a schematic structural view of a BFI processing device provided by a fourth embodiment of the present disclosure.

FIG. 4 is a schematic structural view of a BFI processing device provided by a fourth embodiment of the present disclosure. As illustrated in FIG. 4, the device includes: a signal processing unit 11, and a signal control unit 12.

The signal processing unit 11 is configured to determine whether a piezoelectric signal detected on a pressure sensing layer in response to a touch operation is greater than a pressure threshold, and to generate a trigger signal when the piezoelectric signal is determined to be greater than the pressure threshold. The signal control unit 12 is configured to control a display panel to perform BFI display based on the trigger signal and a logic determination signal.

In the embodiment, the signal processing unit 11 may include an amplifying module and a comparison module. The amplifying module is configured to filter and amplify the piezoelectric signal; and the comparison module is configured to perform a differential comparison between the amplified piezoelectric signal and the pressure threshold, so as to determine whether the amplified piezoelectric signal is greater than the pressure threshold.

The BFI processing device provided by the embodiment is also used for executing the BFI processing method provided in the first embodiment described above.

In the BFI processing device provided by the embodiment, when the signal processing unit 11 determines that the piezoelectric signal detected on the pressure sensing layer is greater than the pressure threshold, the signal control unit 12 controls the display panel to perform BFI display based on the trigger signal and the logic determination signal, so that the phenomenon of trace mura can be avoided.

Figure 5:
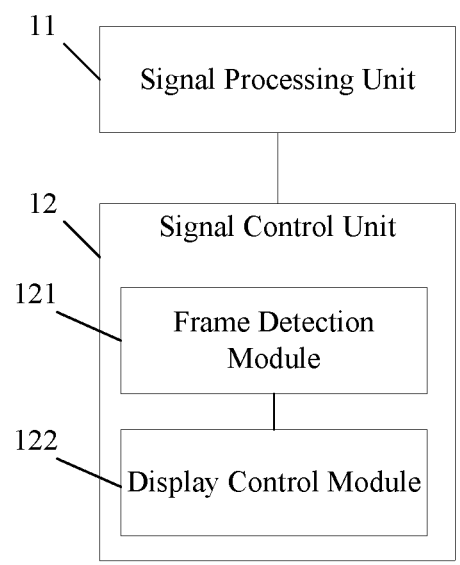
FIG. 5 is a schematic structural view of a BFI processing device provided by a fifth embodiment of the present disclosure.

FIG. 5 is a schematic structural view of a BFI processing device provided by a fifth embodiment of the present disclosure. As illustrated in FIG. 5, in the fifth embodiment that is on the basis of the fourth embodiment, the signal control unit 12 includes: a frame detection module 121 and a display control module 122.

The frame detection module 121 is configured to detect whether the logic value of the trigger signal is a default value and to detect whether the display of a frame is ended based on the logic determination signal. The display control module 122 is configured to perform BFI display in the vertical blanking interval of the frame when the frame detection module 121 detects that the logic value of the trigger signal is the default value and the display of the frame is ended.

Moreover, the frame detection module 121 is also configured to detect whether the display of a next frame is started. The display control module 122 is also configured to: display the next frame when the frame detection module 121 detects that the display of the next frame is started; and continuously execute the step of performing BFI display in the vertical blanking interval of the frame when the frame detection module 121 detects that the display of the next frame is not started.

In the fifth embodiment, the logic determination signal includes a last-row gate signal and a pre-charge capacitance. The last-row gate signal is a gate driving signal being applied to a gate line at the last row. For example, gates lines of the display panel extend along the row directions, and data lines of the display panel extend along the column directions. As the last-row gate signal is adopted as the logic determination signal in the embodiment, the display control module can be connected with a gate driver, so as to acquire the last-row gate signal from the gate driver.

The BFI processing device provided by the fifth embodiment may be used for executing the BFI processing method provided in the second embodiment described above.

In the BFI processing device provided by the fifth embodiment, when the signal processing unit determines that the piezoelectric signal detected on the pressure sensing layer is greater than the pressure threshold, the signal control unit controls the display panel to perform BFI display based on the trigger signal and the logic determination signal, so that the phenomenon of trace mura can be avoided.

Figure 6:
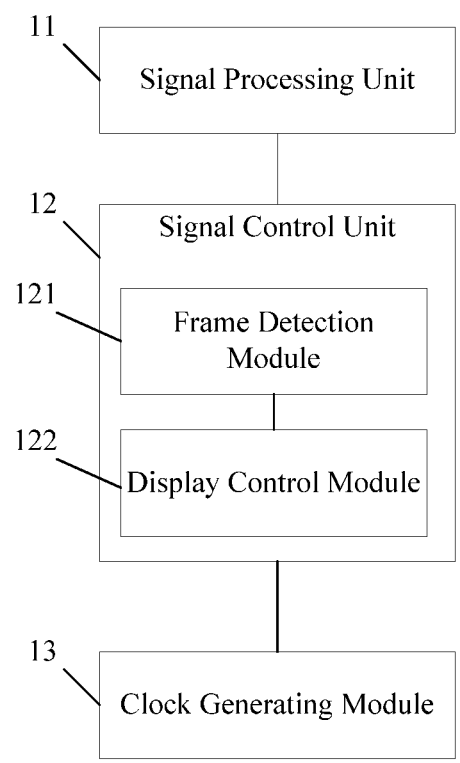
FIG. 6 is a schematic structural view of a BFI processing device provided by a sixth embodiment of the present disclosure.

FIG. 6 is a schematic structural view of a BFI processing device provided by a sixth embodiment of the present disclosure. As illustrated in FIG. 6, in the sixth embodiment that is on the basis of the fourth embodiment, the signal control unit 12 includes: the frame detection module 121, and the display control module 122.

The frame detection module 121 is configured to detect whether the logic value of the trigger signal is a default value and to detect whether the logic determination signal is acquired. The display control module 122 is configured to perform BFI display during the process of displaying a frame when the frame detection module detects that the logic value of the trigger signal is the default value and that the logic determination signal is acquired.

Moreover, the frame detection module 121 is also configured to detect whether the display of a next frame is started. The next frame can be a frame immediately subsequent to the frame that is subject to the BFI display. The display control module 122 is also configured to: display the next frame when the frame detection module 121 detects that the display of the next frame is started; and continuously execute the step of performing BFI display in the process of displaying the certain frame when the frame detection module 121 detects that the display of the next frame is not started.

In the sixth embodiment, the logic determination signal includes a start signal and a logic clock signal.

Moreover, the device further includes: a clock generating unit 13. The clock generating unit 13 is configured to generate the logic clock signal.

The BFI processing device provided by the sixth embodiment may be used for executing the BFI processing method provided by the third embodiment described above.

In the BFI processing device provided by the sixth embodiment, when the signal processing unit determines that the piezoelectric signal detected on the pressure sensing layer is greater than the pressure threshold, the signal control unit controls the display panel to perform BFI display based on the trigger signal and the logic determination signal, so that the phenomenon of trace mura can be avoided.

Figure 7:
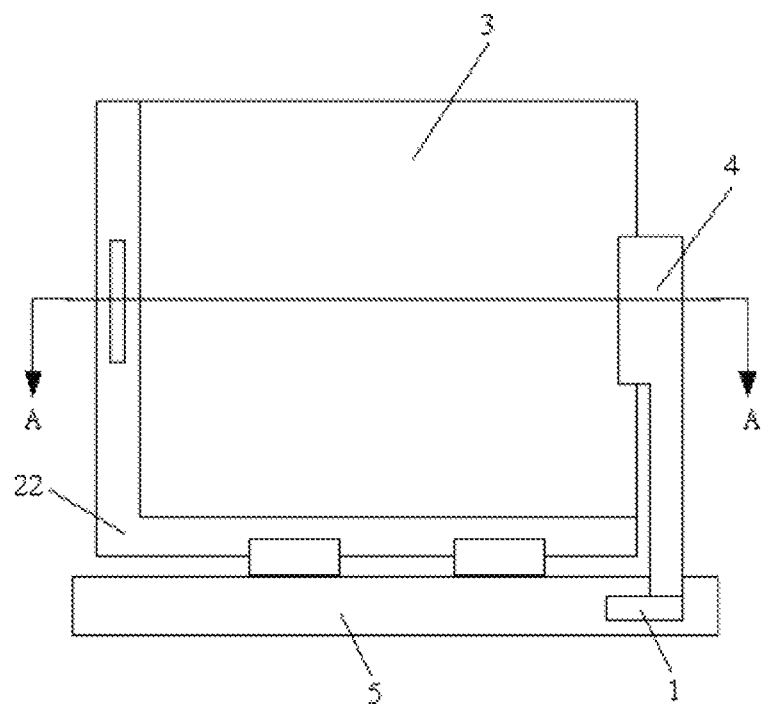
FIG. 7 is a schematic structural view of a display device provided by a seventh embodiment of the present disclosure.
Figure 8:
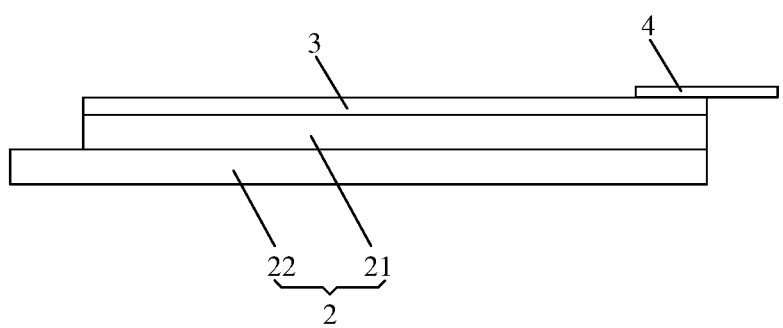
FIG. 8 is a sectional view of the display device along a line A-A in FIG. 7.

FIG. 7 is a schematic structural view of a display device provided by a seventh embodiment of the present disclosure. FIG. 8 is a sectional view of the display device in FIG. 7 along an A-A line. As illustrated in FIGS. 7 and 8, the display device includes a BFI processing device 1, a display panel 2 and a pressure sensing layer 3. The pressure sensing layer 3 is disposed on the display panel 2.

In the seventh embodiment, the BFI processing device 1 adopts the BFI processing device provided by the fourth embodiment, the fifth embodiment or the sixth embodiment described above. For instance, the signal processing unit is connected with the pressure sensing layer 3. The pressure sensing layer 3 is configured to detect the piezoelectric signal in response to a touch operation and output the piezoelectric signal to the signal processing unit.

The display panel 2 includes a first substrate 21 and a second substrate 22 arranged oppositely, and the pressure sensing layer 3 is disposed on a side of the first substrate 21 away from the second substrate 22. The pressure sensing layer 3 may be disposed on an external surface of the second substrate 22 or an external surface of a polarizer above the second substrate 22.

In the embodiment, the first substrate 21 is a color filter (CF) substrate; the second substrate 22 is an array substrate; and liquid crystals may be disposed between the first substrate 21 and the second substrate 22.

The pressure sensing layer 3 may be a layer with a pattern formed on an entire surface or a layer with a crisscrossed pattern.

For instance, the pressure sensing layer 3 may be connected with the BFI processing device 1 through a flexible printed circuit (FPC) 4. The BFI processing device 1 may be disposed on a printed circuit board (PCB) 5. One end of the FPC 4 is bonded to the pressure sensing layer 3 on the second substrate 22, and the other end of the FPC 4 is connected with the BFI processing device 1 on the PCB 5. By adoption of FPC connection, sensitivity of signal transmission and reliability of the products can be better. In actual application, the pressure sensing layer 3 may also be connected with the BFI processing device 1 on the PCB 5 through transferring points between the first substrate 21 and the second substrate 22 and wiring electrodes on the second substrate 22. In actual application, the BFI processing device 1 may not be disposed on the PCB 5 and may be arranged independently.

When the BFI processing device 1 adopts the BFI processing device provided by the fifth embodiment, the last-row gate signal is taken as the logic determination signal, and so the gate line at the last row may be connected with the BFI processing device 1. For instance, a wiring may be formed on the second substrate 22, and the gate line at the last row may be connected with the BFI processing device 1 on the PCB 5 by being led to the PCB 5 through the wiring.

In the display device provided by the embodiment, when the signal processing unit determines that the piezoelectric signal detected on the pressure sensing layer is greater than the pressure threshold, the signal control unit controls the display panel to perform BFI display according to the trigger signal and the logic determination signal, so that the phenomenon of trace mura can be avoided.

In some embodiments of the present disclosure, the BFI processing device can include codes and programs stored in the memories; and one or more processors may execute the codes and the programs to achieve some functions or all the functions of the BFI processing device.

In some embodiments of the present disclosure, the BFI processing device may be a specialized hardware device and configured to achieve some or all the functions of the BFI processing device. For instance, the BFI processing device may be a circuit board or a combination of a plurality of circuit boards and configured to achieve the above functions. In embodiments of the present disclosure, the circuit board or a combination of the plurality of circuit boards may include: (1) one or more processors; (2) one or more non-transitory computer-readable memories connected with the processors; and (3) processor-executable firmware stored in the memories. For example, the BFI processing device can be an FPGA, an ASIC and another chip or their combination thereof.

It should be understood that the above embodiments are only preferred embodiments for the description of the principles of the present disclosure and not intended to limit the present disclosure. Various modifications and improvements may be made by those skilled in the art without departing from the spirit and the essence of the present disclosure and shall also fall within the scope of protection of the present disclosure.

The present disclosure claims the benefits of Chinese patent application No. 201610004367.X, which was filed on Jan. 4, 2016 and is incorporated herein in its entirety by reference as part of this application.

What is claimed is:

1. A black frame insertion (BFI) processing method, comprising:
   determining whether a piezoelectric signal detected in response to a touch operation is greater than a pressure threshold, wherein the pressure threshold is set according to a pressure, which result in occurrence of trace mura during display, upon the touch operation occurring;
   generating a trigger signal when determining that the piezoelectric signal is greater than the pressure threshold;
   controlling a display panel to perform BFI display based on the trigger signal and a logic determination signal;
   wherein controlling the display panel to perform BFI display based on the trigger signal and the logic determination signal comprises:
   detecting whether a logic value of the trigger signal is a default value and detecting whether display of a frame is ended based on the logic determination signal; and
   performing BFI display in a vertical blanking interval of the frame when detecting that the logic value of the trigger signal is the default value and the display of the frame is ended;
   wherein performing BFI display in a vertical blanking interval of the frame comprises:
   in the vertical blanking interval, all thin film transistors of the display panel being switched on, and all data lines of the display panel outputting a same data voltage signal, so as to achieve the BFI display.

2. The BFI processing method according to claim 1, wherein controlling the display panel to perform BFI display based on the trigger signal and the logic determination signal further comprises:
   detecting whether display of a next frame is started, the next frame being subsequent to the frame;
   displaying the next frame when detecting that the display of the next frame is started; and
   when detecting that the display of the next frame is not started, continuing to perform BFI display in the vertical blanking interval of the frame.

3. The BFI processing method according to claim 1, wherein the logic determination signal includes a last-row gate signal and a pre-charge capacitance.

4. The BFI processing method according to claim 1, wherein controlling the display panel to perform BFI display based on the trigger signal and the logic determination signal comprises:
   detecting whether a logic value of the trigger signal is a default value and detecting whether the logic determination signal is acquired; and
   when detecting that the logic value of the trigger signal is the default value and that the logic determination signal is acquired, performing BFI display in a process of displaying a frame.

5. The BFI processing method according to claim 4, wherein controlling the display panel to perform BFI display based on the trigger signal and the logic determination signal further comprises:

detecting whether display of a next frame is started, the next frame being subsequent to the frame;

displaying the next frame when detecting that the display of the next frame is started; and when detecting that the display of the next frame is not started, continuing to perform BFI display in the process of displaying the frame.

6. The BFI processing method according to claim 4, wherein the logic determination signal includes a start signal and a logic clock signal.

7. The display device according to claim 1, wherein the piezoelectric signal is a piezoelectric signal detected by the pressure sensing layer in response to the touch operation.

8. The display device according to claim 7, wherein the pressure sensing layer is disposed on the display panel.

9. The BFI processing method according to claim 1, wherein the same data voltage signal is 0 volts.

10. A black frame insertion (BFI) processing device, comprising:
a signal processing unit; and
a signal control unit; wherein:
the signal processing unit is configured to determine whether a piezoelectric signal detected in response to a touch operation is greater than a pressure threshold and to generate a trigger signal when the piezoelectric signal is determined to be greater than the pressure threshold, wherein the pressure threshold is set according to a pressure, which result in occurrence of trace mura during display, upon the touch operation occurring; and
the signal control unit is configured to control a display panel to perform BFI display based on the trigger signal and a logic determination signal;
wherein the signal control unit comprises:
a frame detection module configured to detect whether a logic value of the trigger signal is a default value and to detect whether display of a frame is ended based on the logic determination signal; and
a display control module configured to perform BFI display in a vertical blanking interval of the frame when the frame detection module detects that the logic value of the trigger signal is the default value and that the display of the frame is ended;
wherein when performing BFI display in a vertical blanking interval of the frame, the display control module is configured to:
in the vertical blanking interval, control all thin film transistors of the display panel to be switched on, and control all data lines of the display panel to output a same data voltage signal, so as to achieve the BFI display.

11. The BFI processing device according to claim 10, wherein the frame detection module is also configured to detect whether display of a next frame is started, the next frame being subsequent to the frame; and
the display control module is also configured to:
display the next frame when the frame detection module detects that the display of the next frame is started; and
continue to perform BFI display in the vertical blanking interval of the frame when the frame detection module detects that the display of the next frame is not started.

12. The BFI processing device according to claim 10, wherein the logic determination signal includes a last-row gate signal and a pre-charge capacitance.

13. The BFI processing device according to claim 10, wherein the signal control unit comprises:
a frame detection module configured to detect whether a logic value of the trigger signal is a default value and to detect whether the logic determination signal is acquired; and
a display control module configured to perform BFI display in a process of displaying a frame when the frame detection module detects that the logic value of the trigger signal is the default value and that the logic determination signal is acquired.

14. The BFI processing device according to claim 13, wherein:
the frame detection module is also configured to detect whether display of a next frame is started, the next frame being subsequent to the frame; and
the display control module is also configured to:
display the next frame when the frame detection module detects that the display of the next frame is started; and
continue to perform BFI display in the process of displaying the frame when the frame detection module detects that the display of the next frame is not started.

15. The BFI processing device according to claim 13, wherein the logic determination signal includes a start signal and a logic clock signal.

16. The BFI processing device according to claim 15, further comprising: a clock generating unit configured to generate the logic clock signal.

17. The BFI processing device according to claim 10, wherein the same data voltage signal is 0 volts.

18. A display device, comprising a display panel, a pressure sensing layer and the BFI processing device according to claim 10, wherein:
the pressure sensing layer is disposed on the display panel and the signal processing unit is connected with the pressure sensing layer; and
the pressure sensing layer is configured to detect the piezoelectric signal in response to the touch operation.

19. The display device according to claim 18, wherein the display panel comprises a first substrate and a second substrate arranged oppositely, and the pressure sensing layer is disposed on a side of the first substrate away from the second substrate.

20. The display device according to claim 19, wherein the pressure sensing layer is connected with the BFI processing device through a flexible printed circuit (FPC).

* * * * *